(12) United States Patent
Lee et al.

(10) Patent No.: US 11,462,360 B2
(45) Date of Patent: Oct. 4, 2022

(54) MULTILAYER ELECTRONIC COMPONENT

(71) Applicant: SAMSUNG ELECTRO-MECHANICS CO., LTD., Suwon-si (KR)

(72) Inventors: Eun Gyu Lee, Suwon-si (KR); Jong Hoon Kim, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 120 days.

(21) Appl. No.: 16/999,164

(22) Filed: Aug. 21, 2020

(65) Prior Publication Data

US 2021/0233712 A1   Jul. 29, 2021

(30) Foreign Application Priority Data

Jan. 23, 2020 (KR) .................. 10-2020-0009469
Aug. 13, 2020 (KR) .................. 10-2020-0101872

(51) Int. Cl.
| | |
|---|---|
| *H01G 4/30* | (2006.01) |
| *H01G 4/12* | (2006.01) |
| *H01G 4/012* | (2006.01) |
| *H01G 4/248* | (2006.01) |

(52) U.S. Cl.
CPC .............. *H01G 4/30* (2013.01); *H01G 4/012* (2013.01); *H01G 4/1227* (2013.01); *H01G 4/248* (2013.01)

(58) Field of Classification Search
CPC ............ H01G 4/12; H01G 2/065; H01G 2/24; H01G 4/0085; H01G 4/012; H01G 4/20; H01G 4/2325; H01G 4/30; H01G 4/306; H01G 4/33; H01G 4/1227; H01G 4/248
See application file for complete search history.

(56) References Cited

U.S. PATENT DOCUMENTS

| | | | | |
|---|---|---|---|---|
| 2001/0019176 | A1* | 9/2001 | Ahiko ................. | H01G 4/232 257/772 |
| 2012/0073129 | A1* | 3/2012 | Abe .................... | H01G 4/30 29/825 |
| 2012/0075766 | A1* | 3/2012 | Nishioka ............. | H01G 4/005 361/301.4 |
| 2013/0308246 | A1* | 11/2013 | Lee ..................... | H01C 7/10 361/301.4 |
| 2016/0240317 | A1* | 8/2016 | Ro ...................... | H01G 4/30 |
| 2017/0345571 | A1* | 11/2017 | Imaeda ............... | H01G 4/248 |
| 2019/0252119 | A1* | 8/2019 | Hasegawa ........... | H01G 4/012 |

FOREIGN PATENT DOCUMENTS

| | | |
|---|---|---|
| JP | 2004-47536 A | 2/2001 |
| JP | 2012-94819 A | 5/2012 |

* cited by examiner

*Primary Examiner* — Michael P McFadden
(74) *Attorney, Agent, or Firm* — Morgan, Lewis & Bockius LLP

(57) ABSTRACT

A multilayer electronic component includes a dielectric layer, and a first internal electrode and a second internal electrode alternately disposed with the dielectric layer interposed therebetween. The first internal electrode includes a first main portion and a first lead portion connecting the first main portion, and the second internal electrode includes a second main portion and a second lead portion connecting the second main portion, and the lead portion of the first internal electrode and a main portion of the second internal electrode are partially overlapped.

17 Claims, 12 Drawing Sheets

MULTILAYER ELECTRONIC COMPONENT

CROSS-REFERENCE TO RELATED APPLICATION(S)

This application claims benefit of priority to Korean Patent Applications No. 10-2020-0009469 filed on Jan. 23, 2020 and No. 10-2020-0101872 filed on Aug. 13, 2020, with the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a type of multilayer electronic component, may be a chip-type condenser mounted on the printed circuit boards of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for miniaturization and high capacitance of multilayer ceramic capacitors are increasing.

In addition, as recent interest in vehicle electric/electronic components has increased, multilayer ceramic capacitors have also come to require relatively high reliability and relatively high strength to be used in vehicle or infotainment systems.

Meanwhile, as a process of mounting a multilayer ceramic capacitor on a substrate, there may be a horizontal mounting process of mounting in a stacking direction of a dielectric layer and an internal electrode, and a vertical mounting process of mounting in a direction, perpendicular to the stacking direction.

Compared to the horizontal mounting process, there may be a problem in the vertical mounting process in that reliability for moisture resistance may be deteriorated as a distance of a moisture penetration path is decreased. In order to solve this, an attempt was made to improve reliability for moisture resistance by arranging a lead portion connecting the external electrode and the internal electrode to extend the moisture penetration path, during a vertical mounting operation.

However, in the case of disposing the lead portion, since an end of the internal electrode and an end of the lead portion connected to the other internal electrode are arranged to overlap each other, warpage stress may be concentrated at the end of the internal electrode, cracks may occur due to the warpage stress, and reliability for moisture resistance may be deteriorated.

SUMMARY

An aspect of the present disclosure is to provide a multilayer electronic component with improved bending strength properties.

Another aspect of the present disclosure is to provide a multilayer electronic component having excellent reliability for moisture resistance.

However, the object of the present disclosure is not limited to the above, and will be more easily understood in the course of describing the specific embodiment of the present disclosure.

According to an aspect of the present disclosure, a multilayer electronic component includes a body including a first surface and a second surface, opposing each other in a first direction, a third surface and a fourth surface, connected to the first and second surfaces, and opposing each other in a second direction, and a fifth surface and a sixth surface, connected to the first to fourth surfaces, and opposing each other in a third direction, including a dielectric layer, and a first internal electrode and a second internal electrode alternately disposed with the dielectric layer interposed therebetween in the third direction; a first external electrode disposed on the third surface; and a second external electrode disposed on the fourth surface, wherein the first internal electrode includes a first main portion and a first lead portion connecting the first main portion and the third surface, and the second internal electrode includes a second main portion and a second lead portion connecting the second main portion and the fourth surface, wherein L1 is 0.05 mm or more, and H2/H1 is 0.3 or more and 0.9 or less, where H1 is a distance of the first main portion in the first direction, H2 is a distance of the first lead portion on the third surface in the first direction, and L1 is a distance of an area by which the first lead portion and the second main portion overlap in the second direction.

According to another aspect of the present disclosure, a multilayer electronic component includes a body including a first surface and a second surface, opposing each other in a first direction, a third surface and a fourth surface, connected to the first and second surfaces, and opposing each other in a second direction, and a fifth surface and a sixth surface, connected to the first to fourth surfaces, and opposing each other in a third direction, including a dielectric layer, and a first internal electrode and a second internal electrode alternately disposed with the dielectric layer interposed therebetween in the third direction; a first external electrode disposed on the third surface; and a second external electrode disposed on the fourth surface, wherein the first internal electrode includes a first main portion and a first lead portion connecting the first main portion and the third surface, the second internal electrode includes a second main portion and a second lead portion connecting the second main portion and the fourth surface, and an edge of the first main portion disposed close to the fourth surface and an edge of the second main portion disposed close to the third surface have a rounded shape, wherein D1 is 1.5 times or more of R1, and T1−T2 is R1*2 or more and T1*0.8 or less, where T1 is a distance of the first main portion in the first direction, T2 is a distance of the first lead portion on the third surface in the first direction, R1 is a radius of the rounded shape, and D1 is a distance of an area by which the first lead portion and the second main portion overlap in the second direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
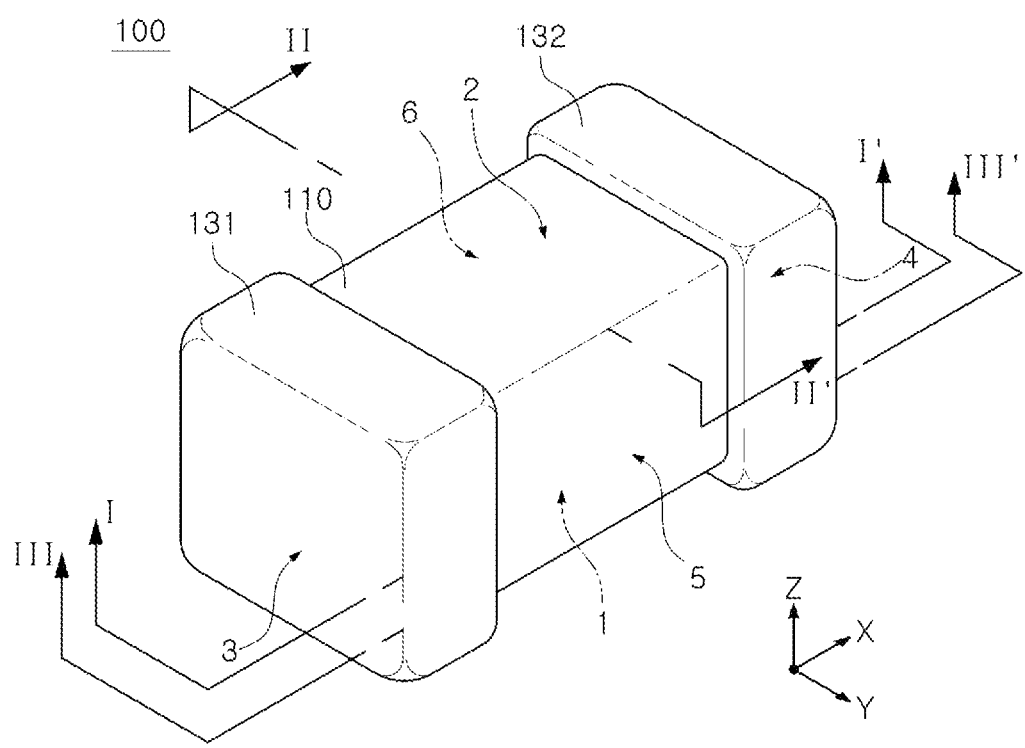
FIG. 1 is a schematic perspective view of a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

A value used to describe a parameter such as a 1-D dimension of an element including, but not limited to, "length," "width," "thickness," "diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, an X direction may be defined as a second direction or a longitudinal direction of a body and an internal electrode, a Y direction may be defined as a third direction, a stacking direction, or a width direction of a body, and a Z direction may be defined as a first direction, a thickness direction of a body, or a width direction of an internal electrode.

Multilayer Electronic Component

FIG. 1 is a schematic perspective view of a multilayer electronic component according to an embodiment of the present disclosure.

Figure 2:
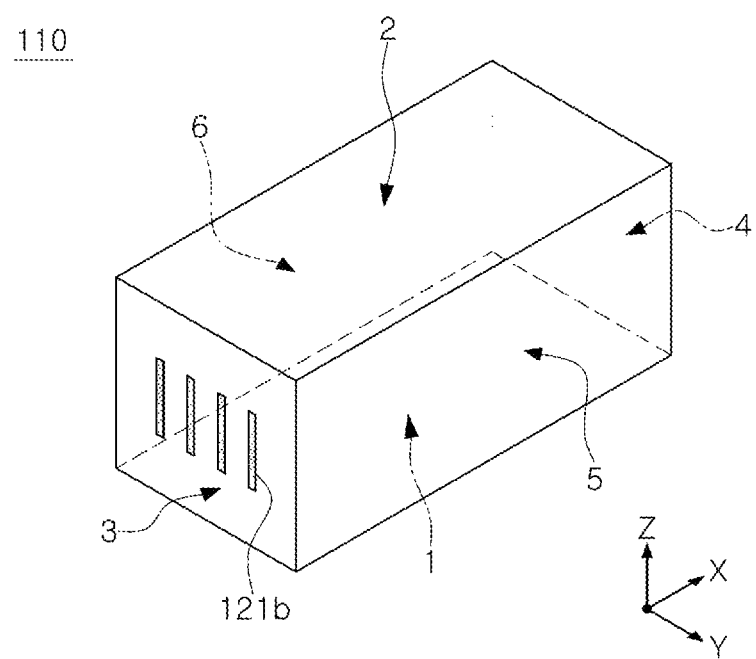
FIG. 2 is a perspective view of the body of the multilayer electronic component of FIG. 1, except for the external electrode.

FIG. 2 is a perspective view of the body of the multilayer electronic component of FIG. 1, except for the external electrode.

Figure 3:
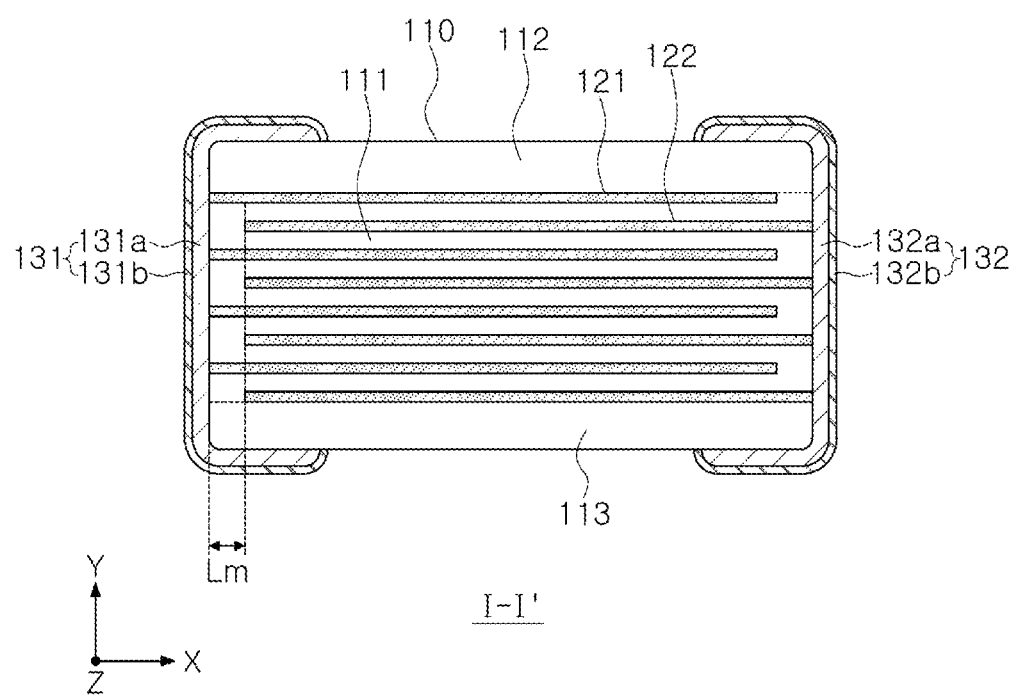
FIG. 3 is a cross-sectional view taken along line I-I' of FIG. 1.

FIG. 3 is a cross-sectional view taken along line I-I' of FIG. 1.

Figure 4:
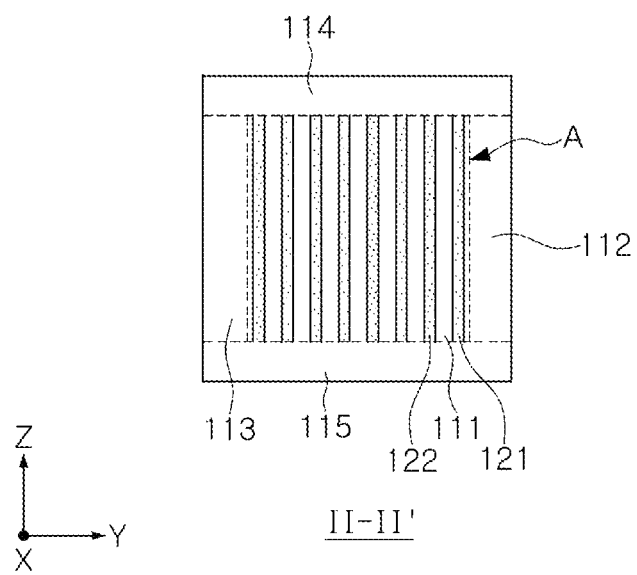
FIG. 4 is a cross-sectional view taken along line II-II' of FIG. 1.

FIG. 4 is a cross-sectional view taken along line II-II' of FIG. 1.

Figure 5A:
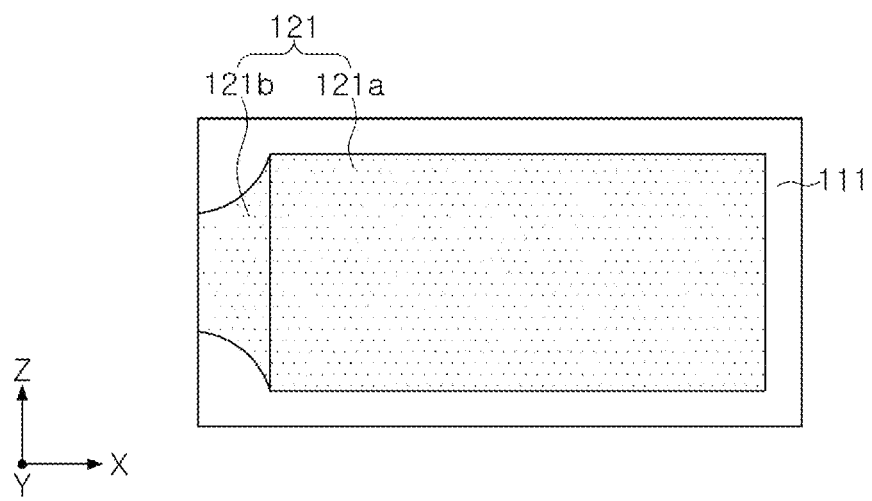
FIG. 5A is a plan view illustrating a first internal electrode according to an embodiment of the present disclosure.

FIG. 5A is a plan view illustrating a first internal electrode according to an embodiment of the present disclosure.

Figure 5B:
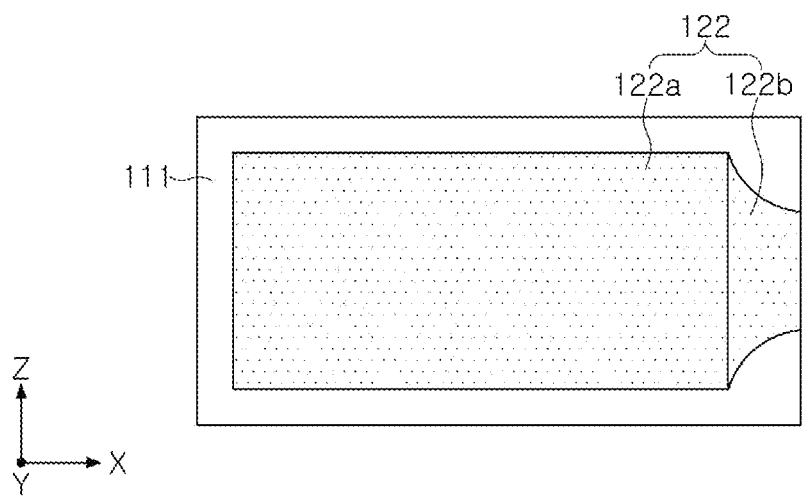
FIG. 5B is a plan view illustrating a second internal electrode according to an embodiment of the present disclosure.

FIG. 5B is a plan view illustrating a second internal electrode according to an embodiment of the present disclosure.

Figure 5C:
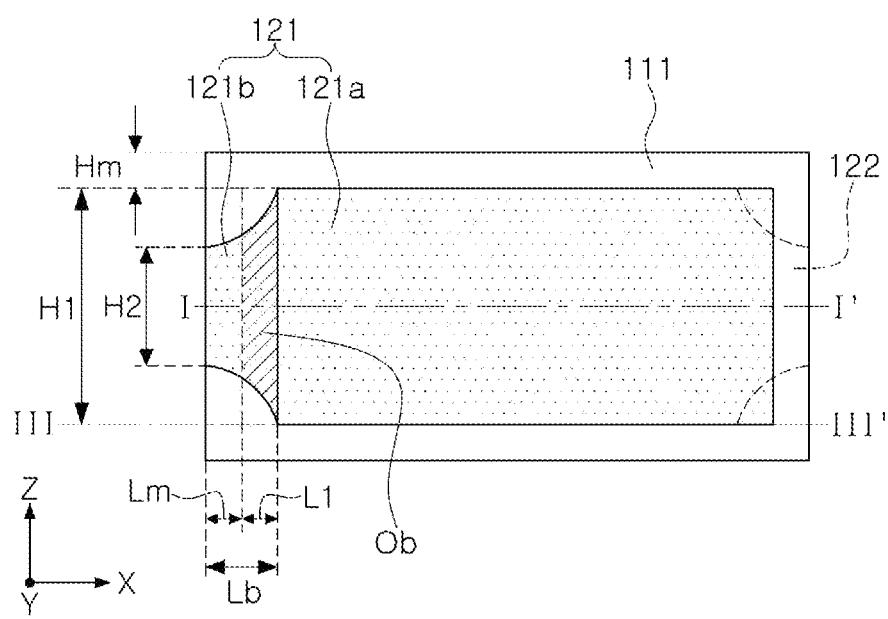
FIG. 5C is a plan view illustrating overlapped first and second internal electrodes according to an embodiment of the present disclosure.

FIG. 5C is a plan view illustrating overlapped first and second internal electrodes according to an embodiment of the present disclosure.

Figure 6:
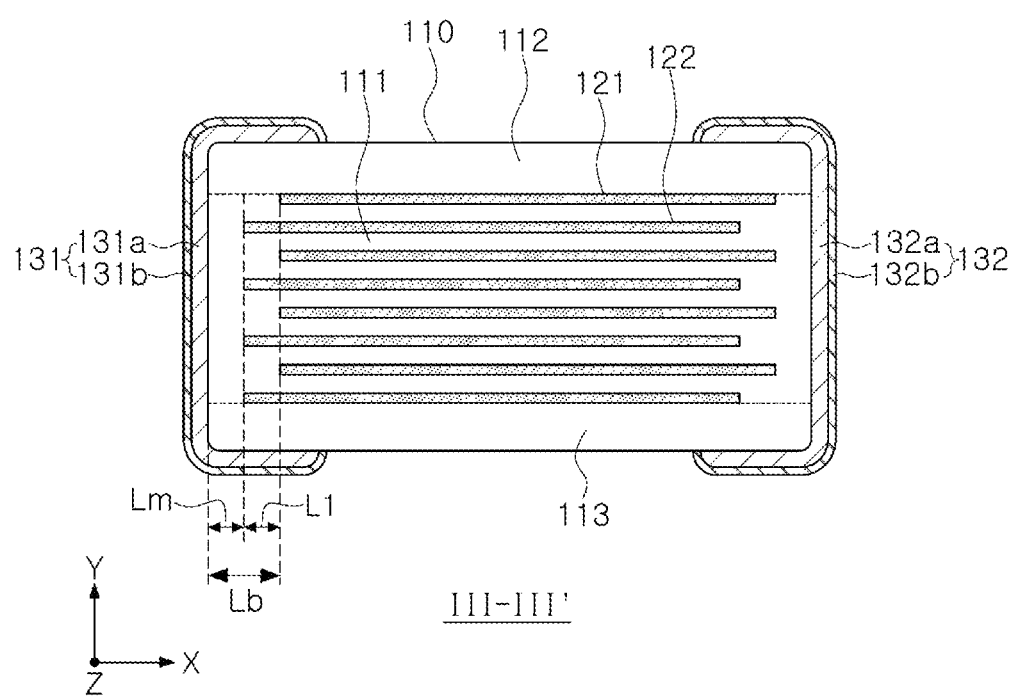
FIG. 6 is a cross-sectional view taken along line III-III' of FIG. 1.

FIG. 6 is a cross-sectional view taken along line III-III' of FIG. 1.

Figure 7:
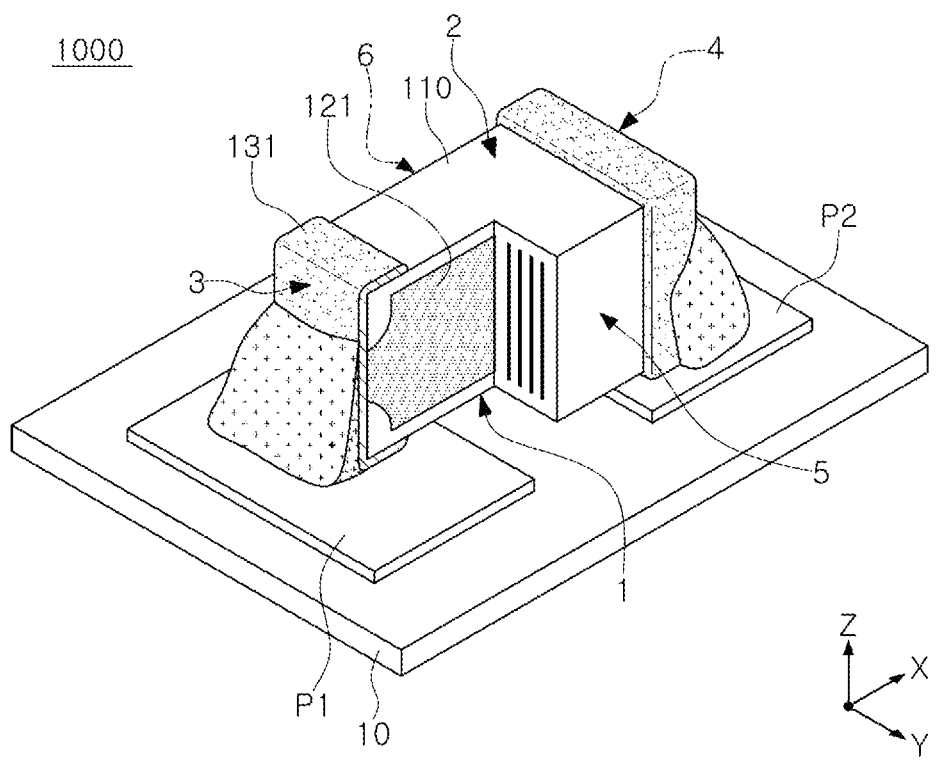
FIG. 7 is a schematic perspective view of a mounting substrate on which the multilayer electronic component of FIG. 1 is mounted.

FIG. 7 is a schematic perspective view of a mounting substrate on which the multilayer electronic component of FIG. 1 is mounted.

Hereinafter, a multilayer electronic component 100 according to an embodiment of the present disclosure will be described with reference to FIGS. 1 to 7.

The multilayer electronic component 100 according to an embodiment of the present disclosure may include a body 110 including a first surface 1 and a second surface 2 opposing in a first direction (a Z direction), a third surface 3 and a fourth surface 4 connected to the first and second surfaces and opposing each other in a second direction (an X direction), and a fifth surface 5 and a sixth surface 6 connected to the first to fourth surfaces and opposing each other in a third direction (a Y direction), and including a dielectric layer 111, and a first internal electrode 121 and a second internal electrode 122 alternately disposed with the dielectric layer interposed therebetween in the third direction; a first external electrode 131 disposed on the third surface; and a second external electrode 132 disposed on the fourth surface. The first internal electrode 121 may include a first main portion 121a and a first lead portion 121b connecting the first main portion 121a and the third surface 3, and the second internal electrode 122 may include a second main portion 122a and a second lead portion 122b connecting the second main portion 122a and the fourth surface 4. L1 may be 0.05 mm or more, and H2/H1 may be 0.3 or more and 0.9 or less, where H1 is a distance of the first main portion in the first direction, H2 is a distance of the first lead portion 121b on the third surface 3 in the first direction, and L1 is a distance of an area by which the first lead portion 121b and the second main portion 122a overlap in the second direction.

In the body 110, the dielectric layer 111 and the internal electrodes 121 and 122 may be alternately stacked.

A specific shape of the body 110 is not particularly limited, but as illustrated, the body 110 may be formed to have a hexahedral or a similar shape. Due to shrinkage of ceramic powder contained in the body 110 during a firing process, the body 110 may not have a perfectly hexahedral shape with completely straight lines, but may have a substantially hexahedral shape.

The body 110 may have the first and second surfaces 1 and 2 opposing each other in the first direction (the Z direction), the third and fourth surfaces 3 and 4 connected to the first and second surfaces 1 and 2 and opposing each other in the second direction (the X direction), and fifth and sixth surfaces 5 and 6 connected to the first and second surfaces 1 and 2, connected to the third and fourth surfaces 3 and 4, and opposing each other in the third direction (the Y direction).

A plurality of dielectric layers 111 forming the body 110 may be in a sintered state, and a boundary between adjacent dielectric layers 111 may be integrated to such an extent that it is difficult to identify the device without using a scanning electron microscope (SEM).

According to an embodiment of the present disclosure, a raw material for forming the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved in $BaTiO_3$, or the like.

As the material for forming the dielectric layer 111, various ceramic additives, organic solvents, plasticizers, binders, dispersants, or the like may be added to powder particles formed of a material such as barium titanate ($BaTiO_3$), according to the purpose of the present disclosure.

The body 110 may include a capacitance forming portion A disposed in the body 110 and including the first internal electrode 121 and the second internal electrode 122 disposed to oppose each other with the dielectric layer 111 interposed therebetween, to form capacitance; and protective layers 112 and 113 formed on both end surfaces of the capacitance forming portion A, respectively, in the third direction (the Y direction).

The capacitance forming portion A may be a portion for contributing to formation of capacitance of the capacitor, and may be formed by repeatedly stacking the plurality of first and second internal electrodes 121 and 122 in the third direction (the Y direction) with the dielectric layer 111 interposed therebetween.

The protective layers 112 and 113 may be formed by stacking a single dielectric layer or two or more dielectric layers on both end surfaces of the capacitance forming portion A, respectively, in the third direction (the Y direction), and may basically play a role in preventing damage to the internal electrodes due to physical or chemical stress.

The protective layers 112 and 113 may not include an internal electrode, and may include the same material as the dielectric layer 111.

In addition, margin portions 114 and 115 may be arranged on both end surfaces of the capacitance forming portion A in the first direction (the Z direction). The margin portions 114 and 115 may include a margin portion 114 disposed on the second surface 2 of the body 110, and a margin portion 115 disposed on the first surface 1 of the body 110.

As illustrated in FIG. 4, the margin portions 114 and 115 refer to an area between both ends of the first and second internal electrodes 121 and 122 and an outer surface of the body 110, when viewed in a cross-section (a Z-Y cross-section) in which the body 110 is cut in the first and third directions.

The margin portions 114 and 115 may basically play a role in preventing damage to the internal electrodes due to physical or chemical stress.

The margin portions 114 and 115 may be those prepared by applying a conductive paste to form an internal electrode, except for a region in which the margin portions are formed on a ceramic green sheet.

In addition, in order to suppress a step difference by the internal electrodes 121 and 122, after stacking, the internal electrodes may be cut to be exposed from the first and second surfaces 1 and 2 of the body, and then a single dielectric layer or two or more dielectric layers may be stacked on both end surfaces of the capacitance forming portion A in both directions in the first direction (the Z direction) in the first direction, to form the margin portions 114 and 115

The internal electrodes 121 and 122 and the dielectric layer 111 may be alternately arranged in the third direction (the Y direction). The internal electrodes 121 and 122 may include first and second internal electrodes 121 and 122 alternately arranged in the third direction (the Y direction) to oppose each other with a dielectric layer interposed therebetween.

The first internal electrode 121 may include the first main portion 121a and the first lead portion 121b connecting the first main portion 121a and the third surface 3, and the second internal electrode 122 may include the second main portion 122a and the second lead portion 122b connecting the second main portion 122a and the fourth surface 4.

The first main portion 121a may be disposed to be spaced apart from the third and fourth surfaces 3 and 4, and may be electrically connected to the first external electrode 131 disposed on the third surface 3 through the first lead portion 121b exposed from the third surface 3, and the second main portion 122a may be disposed to be spaced apart from the third and fourth surfaces 3 and 4, and may be electrically connected to the second external electrode 132 disposed on the fourth surface 4 through the second lead portion 122b exposed from the fourth surface 4.

For example, the first internal electrode 121 may not be connected to the second external electrode 132 but may be connected to the first external electrode 131, and the second internal electrode 122 may not be connected to the first external electrode 131 but may be connected to the second external electrode 132. Therefore, the first internal electrode 121 may be formed to be spaced apart from the fourth surface 4 by a certain distance, and the second internal electrode 122 may be formed to be spaced apart from the third surface 3 by a certain distance.

The first and second internal electrodes 121 and 122 may be electrically separated from each other by the dielectric layer 111 interposed therebetween.

As a process of mounting a multilayer ceramic capacitor on a substrate, there may be a horizontal mounting process of mounting in a stacking direction of a dielectric layer and an internal electrode, and a vertical mounting process of mounting in a direction, perpendicular to the stacking direction. Referring to FIG. 2, the stacking direction may refer to the third direction (the Y direction), and when mounted horizontally, the fifth surface 5 or the sixth surface 6 may become a mounting surface, and when mounted vertically, the first surface 1 or the second surface 2 may become a mounting surface.

Compared to the horizontal mounting process, there may be a problem in the vertical mounting process that reliability for moisture resistance may be deteriorated as a distance of a moisture penetration path is shorter.

Figure 8:
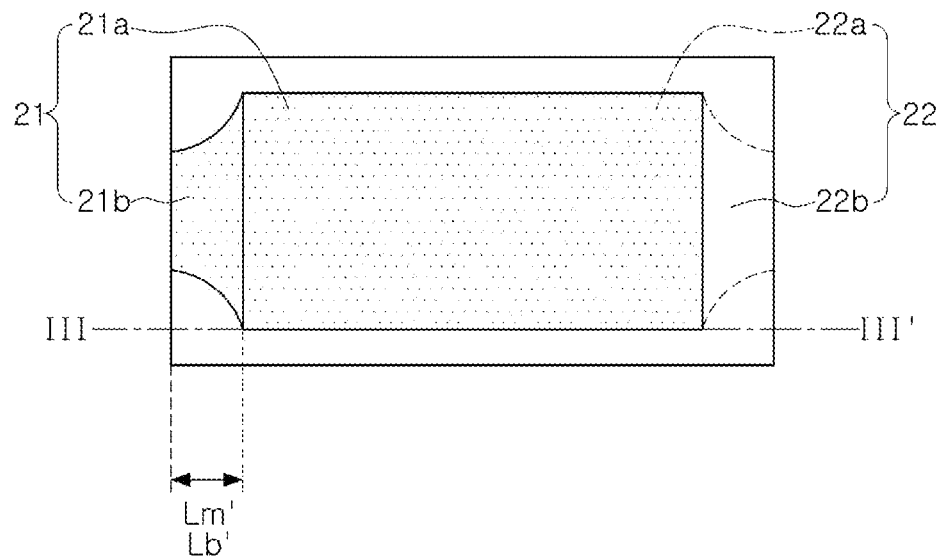
FIG. 8 is a plan view illustrating overlapped first and second internal electrodes according to Comparative Example 1.

In order to solve this, as illustrated in FIG. 8, which may be a plan view illustrating that the first and second internal electrodes 21 and 22 overlap according to Comparative Example 1, the internal electrodes 21 and 22 may be designed to include main portions 21a and 22a, and lead portions 21b and 22b, the main portions 21a and 22a may be not directly exposed from the body externally, external electrodes and the main portions 21a and 22a may be connected to each other, the lead portions 21b and 22b having a relatively short width on an exposed surface may be arranged to lengthen the moisture penetration path during vertical mounting, to improve reliability for moisture resistance.

As illustrated in FIG. 8, when a lead portion 21b is disposed such that a distance (Lm') of a region in which an internal electrode 21 and an internal electrode 22 do not overlap is identical to a distance (Lb') of a lead portion, an end of a main portion 22a and an end of the lead portion 21b may be arranged to overlap each other. For example, referring to FIG. 9, which may be an X-Y cross-section in an end of the internal electrode in the first direction (the X direction), since a distance (Lm') of a region in which an internal electrode 21 and an internal electrode 22 do not overlap is identical to a distance (Lb') of a lead portion, an end of a main portion 22a and an end of the lead portion 21b may be arranged to overlap each other. Therefore, warpage stress may be concentrated in ends of the main portions 21a and 22a, and a possibility of occurring cracks due to the warpage stress may be increased, to deteriorate reliability for moisture resistance.

Therefore, in the present disclosure, the lead portion 121b of the first internal electrode and the main portion 122a of the second internal electrode may be partially overlapped, and a ratio (H2/H1) of a width (H2) of the lead portion exposed from the body relative to a width (H1) of the main portion may be controlled, to improve bending strength properties and improve reliability for moisture resistance, even when the multilayer electronic component is vertically mounted.

Referring to FIG. 5C, if a distance of the first main portion 121a in the first direction (the Z direction) is H1, and a distance of the first lead portion 121b on the third surface 3 in the first direction (the Z direction) is H2, and a distance of a region Ob, in which the first lead portion 121b and the second main portion 122a overlap, in the second direction (the X direction) is L1, L1 may be 0.05 mm or more, and H2/H1 may be 0.3 or more and 0.9 or less. In this case, H1, H2, and L1 may be measured in a central portion of the body 110 in the third direction (the Y direction). For example, H1 and H2 can be measured after exposing cross-sections such as FIG. 5A by polishing the fifth surface or the sixth surface. L1 can be measured after exposing cross-sections such as FIG. 6 by polishing the first surface or the second surface.

Since the lead portion 121b of the first internal electrode and the main portion 122a of the second internal electrode may be partially overlapped, referring to FIG. 6, which may be an X-Y cross-section in an end of the internal electrode in the first direction (the X direction), an end of the first main portion 121a and an end of the second main portion 122a may be arranged not to overlap each other. An end of the first lead portion 121b and an end of the second main portion 122a may be alternately arranged in the second direction (the X direction) by L1, which may be a distance of a region Ob, in which the first lead portion 121b and the second main portion 122a overlap, in the second direction (the X direction). Therefore, a concentration of stress at the end of the internal electrode may be dispersed, and an effect of thickening the dielectric layer between the internal electrodes in which the ends thereof overlap may be secured, to improve crack resistance and improve bending strength properties. In addition, since a thickness of the dielectric layer between the internal electrodes in which the ends thereof overlap becomes thicker, sintering density of the dielectric layer may be improved to improve reliability for moisture resistance. In addition, even when cracking occurs, since probability of occurrence by avoiding a region in which the first internal electrode 121 and the second internal electrode 122 overlap may be increased, probability of occurrence of a failure in reliability for moisture resistance may be lowered.

When the distance (L1) of the region Ob, in which the first lead portion 121b and the second main portion 122a overlap, in the second direction (the X direction) is less than 0.05 mm, an effect of stress distribution may not be sufficient. When the crack occurs, since the probability of the occurrence of cracks may be lowered by avoiding the region in which the first internal electrode 121 and the second internal electrode 122 overlap, probability of occurrence of poor reliability for moisture resistance when cracking increases. An upper limit of L1 need not be particularly limited, and may be determined by considering designed capacitance of the multilayer ceramic capacitor. When L1 is too large, since an area in which a step difference is generated by the internal electrodes 121 and 122 may be increased, a shape of the body may be poor or a crack generation rate may increase, and since an area in which the internal electrodes 121 and 122 overlap is reduced to be difficult to secure a capacitance, L1 may be 0.2 mm or less.

In addition, when H2/H1 is less than 0.3, electrical connectivity between the internal electrodes 121 and 122 and the external electrodes 131 and 132 may be deteriorated. Otherwise, since an effect of dispersing the stress may not be sufficient, and the probability of cracking may be lowered by avoiding an area in which the first internal electrode 121 and the second internal electrode 122 overlap when a crack occurs, the probability of a failure in reliability occurring in terms of moisture resistance may become high when cracking occurs. Therefore, H2/H1 may be 0.3 or more and 0.9 or less. More preferably, H2/H1 may be 0.3 or more and 0.85 or less.

The main portions 121a and 122a may basically overlap each other to form capacitance.

Shapes of the main portions 121a and 122a need not be particularly limited, but, for example, the main portions 121a and 122a may have a rectangular shape. When the main portions 121a and 122a have a rectangular shape in a Z-X cross-section, an area in which the first internal electrode and the second internal electrode overlap may be increased as much as possible, to improve capacitance of the multilayer electronic component. However, the present disclosure is not limited thereto, and a corner disposed close to the fourth surface of the first main portion 121a and a corner disposed close to the third surface of the second main portion 122a, as in another embodiment of the present disclosure described later, may have a rounded shape.

The lead portions 121b and 122b may basically serve to electrically connect the main portions 121a and 122a and the external electrodes 131 and 132, and lengthen a moisture penetration path to improve reliability for moisture resistance. In addition, the first lead portion 121b may overlap a portion of the second main portion 122a to form capacitance, and the second lead portion 122b may overlap a portion of the first main portion 121a to form capacitance.

The lead portions 121b and 122b may have a tapered shape that gradually decreases in width in a direction from a surface to which the main portion is connected toward a surface from which the lead portion is exposed. For example, the first lead portion 121b may have a shape that gradually decreases in distance in the first direction (the Z direction), as the first main portion 121a moves toward the third surface, and the second lead portion 122b may have a shape that gradually decreases in distance in the first direction (the Z direction), as the second main portion 122a moves toward the fourth surface. Therefore, stress may be gradually distributed to effectively dispersing the stress.

In addition, a distance of the first lead portion 121b and a distance of the first main portion 121a in the first direction (the Z direction), at a side in which the first lead portion 121b is in contact with the first main portion 121a, are configured to be the same, to more effectively disperse stress transmitted to a side in which the first lead portion 121b is in contact with the first main portion 121a.

One of the first, second, fifth, and sixth surfaces 1, 2, 5, and 6 of the body 110 may be a mounting surface.

As described above, as a moisture penetration path is shortened or bending stress is concentrated during vertical mounting, since the bending strength and reliability for moisture resistance may be particularly problematic, an effect of improving bending strength properties and improving reliability for moisture resistance according to the present disclosure may be significantly accomplished when vertical mounting. The effect may be noticeable. Therefore, the first surface 1 or the second surface 2 may be a mounting surface.

In this case, the mounting surface may refer to a surface opposing one surface of a substrate when mounted on the substrate. Referring to FIG. 7 schematically illustrating a perspective view of a mounting substrate 1000 on which the multilayer electronic component 100 of FIG. 1 is mounted, the multilayer electronic component 100 may be mounted on a substrate 10 in which electrode pads P1 and P2 are arranged on one surface thereof, such that external electrodes 131 and 132 are arranged on the electrode pads P1 and P2, respectively.

Since the first surface 1 may be disposed to oppose the one surface of the substrate 10, the first surface 1 may become a mounting surface, and the multilayer electronic component may be vertically mounted in a direction (the Z direction) perpendicular to a direction (the Y direction) in which internal electrodes and dielectric layers are stacked.

A material for forming the internal electrodes 121 and 122 is not particularly limited. For example, the internal electrodes 121 and 122 may be formed by printing a conductive paste for internal electrodes containing one or more of nickel (Ni), copper (Cu), palladium (Pd), silver (Ag), gold (Au), platinum (Pt), tin (Sn), tungsten (W), titanium (Ti), and alloys thereof, on a ceramic green sheet.

As a printing method of the conductive paste for internal electrodes, a screen-printing method or a gravure printing method may be used, but the present disclosure is not limited thereto.

In this case, the main portions 121a and 122a and the lead portions 121b and 122b may be formed using the same material, but are not limited thereto, and the main portions 121a and 122a and the lead portions 121b and 122b may be formed by printing different conductive pastes on the ceramic green sheet.

The external electrodes 131 and 132 may be disposed on the body 110, and may be connected to the internal electrodes 121 and 122.

As illustrated in FIG. 3, the external electrodes 131 and 132 respectively disposed on the third and fourth surfaces 3 and 4 of the body 110, and respectively connected to the first and second internal electrodes 121 and 122 may be included.

In this embodiment, although the structure in which the multilayer electronic component 100 has two external electrodes 131 and 132 is described, the number and shape of the external electrodes 131 and 132 may be changed depending on different purposes such as a shape of the internal electrodes 121 and 122 and the like.

The external electrodes 131 and 132 may be formed using any material as long as they have electrical conductivity such as metal, a specific material may be determined in consideration of electrical characteristics, structural stability, and the like, and may have a multilayer structure.

For example, as illustrated in FIG. 3, the external electrodes 131 and 132 may include electrode layers 131a and 132a disposed on the body 110, and plating layers 131b and 132b formed on the electrode layers 131a and 132a.

For more specific examples of the electrode layers 131a and 132a, the electrode layers 131a and 132a may be plastic electrodes including conductive metal and glass, or resin-based electrodes including a conductive metal and a resin.

In addition, the electrode layers 131a and 132a may have a form in which the plastic electrodes and the resin-based electrodes are sequentially formed on the body. In addition, the electrode layers 131a and 132a may be formed by transferring a sheet including the conductive metal on the body, or may be formed by transferring the sheet including the conductive metal on the sintered electrode. In addition, the first and second electrode layers 131a and 132a may be formed using an atomic layer deposition (ALD) process, a molecular layer deposition (MLD) process, a chemical vapor deposition (CVD) process, a sputtering process, or the like.

The conductive metal used for the electrode layers 131a and 132a is not particularly limited as long as it is a material that may be electrically connected to the internal electrode to form capacitance. For example, one or more selected from the group consisting of nickel (Ni), copper (Cu), palladium (Pd), silver (Ag), gold (Au), platinum (Pt), tin (Sn), tungsten (W), titanium (Ti), and alloys thereof may be included.

For more specific examples of the plating layers 131b and 132b, the plating layers 131b and 132b may be nickel (Ni) plating layers, or tin (Sn) plating layers, may have a form in which the nickel (Ni) plating layers and the tin (Sn) plating layers are sequentially formed, and may have a form in which the tin (Sn) plating layer, the nickel (Ni) plating layer, and the tin (Sn) plating layer are formed sequentially. In addition, the plating layers 131b and 132b may include a plurality of nickel (Ni) plating layers and/or a plurality of tin (Sn) plating layers.

Figure 10A:
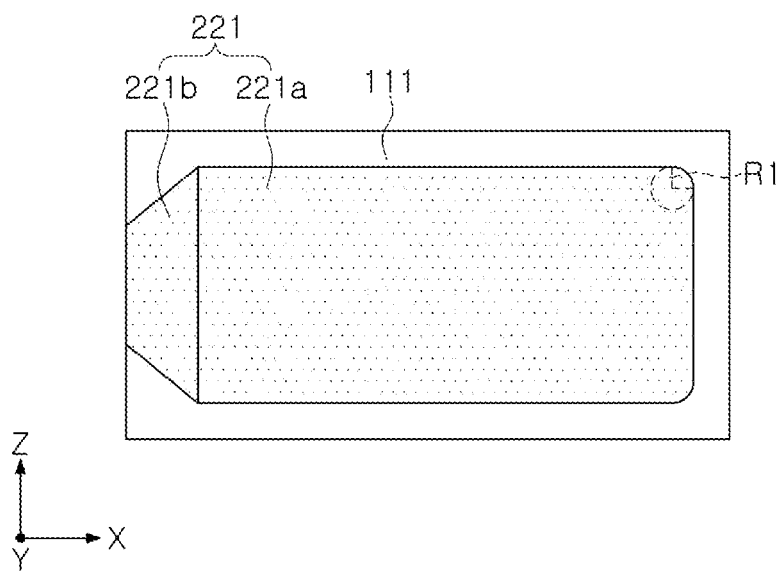
FIG. 10A is a plan view of a first internal electrode according to another embodiment of the present disclosure.

FIG. 10A is a plan view of a first internal electrode according to another embodiment of the present disclosure.

Figure 10B:
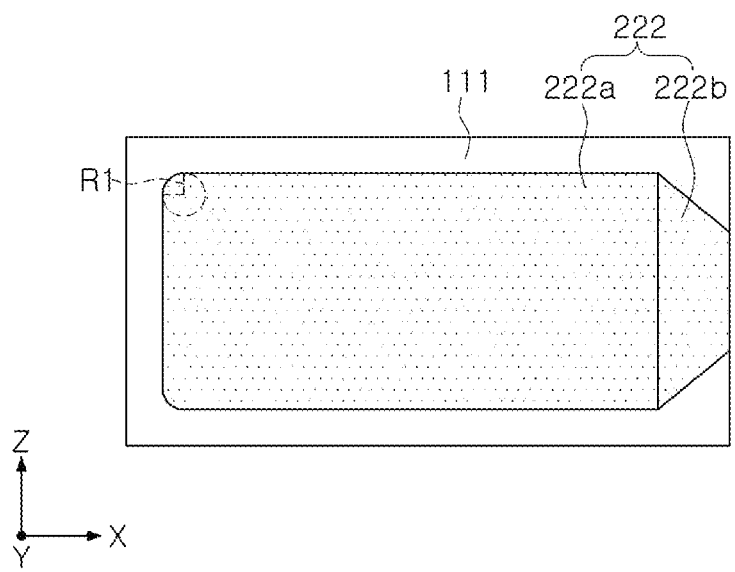
FIG. 10B is a plan view of a second internal electrode according to another embodiment of the present disclosure.

FIG. 10B is a plan view of a second internal electrode according to another embodiment of the present disclosure.

Figure 10C:
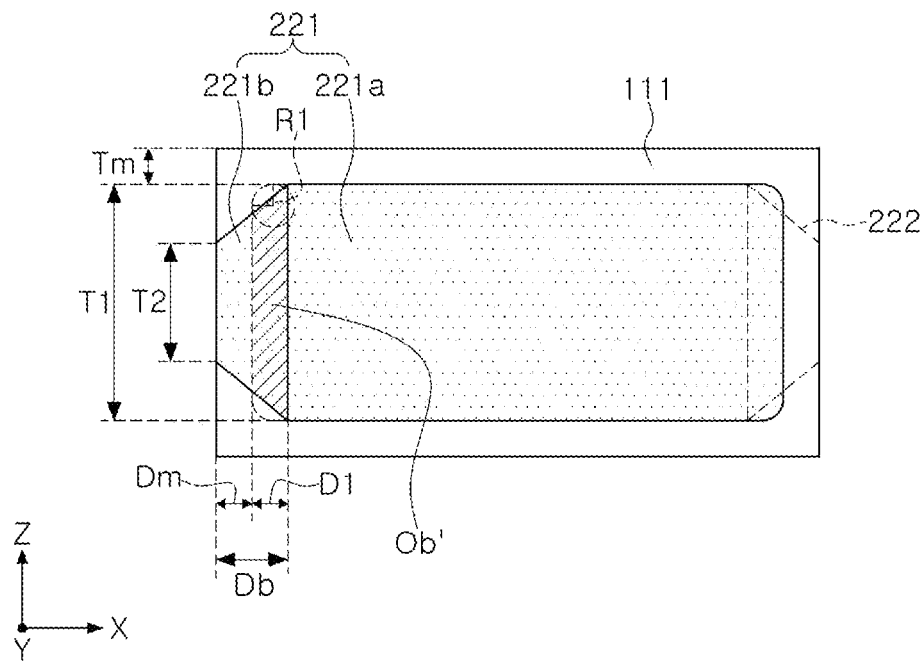
FIG. 10C is a plan view illustrating overlapped first and second internal electrodes according to another embodiment of the present disclosure.

FIG. 10C is a plan view illustrating overlapped first and second internal electrodes according to another embodiment of the present disclosure.

Hereinafter, a multilayer electronic component according to another embodiment of the present disclosure will be described in detail with reference to FIGS. 10A, 10B, and 10C. However, since the multilayer electronic component according to another embodiment of the present disclosure has no other configuration, except for the shape and configuration of the multilayer electronic component 100 and the internal electrode according to an embodiment of the present disclosure, the common descriptions of the multilayer electronic component 100 according to an embodiment of the present disclosure will be omitted in order to avoid overlapping descriptions. In addition, a perspective view of a multilayer electronic component according to another embodiment of the present disclosure, a perspective view of a body illustrated excluding an external electrode, a cross-sectional view taken along line I-I', and a cross-sectional view taken along line II-II' may be the same as those illustrated in FIGS. 1 to 4, and, thus, may be omitted.

A multilayer electronic component according to another embodiment of the present disclosure may include a body 110 including a first surface 1 and a second surface 2 opposing in a first direction (a Z direction), a third surface 3 and a fourth surface 4 connected to the first and second surfaces and opposing each other in a second direction (an X direction), and a fifth surface 5 and a sixth surface 6 connected to the first to fourth surfaces and opposing each other in a third direction (a Y direction), and including a dielectric layer 111, and a first internal electrode 221 and a second internal electrode 222 alternately disposed with the dielectric layer interposed therebetween in the third direction; a first external electrode 131 disposed on the third surface; and a second external electrode 132 disposed on the fourth surface. The first internal electrode 221 may include a first main portion 221a and a first lead portion 221b connecting the first main portion 221a and the third surface 3, and the second internal electrode 222 may include a second main portion 222a and a second lead portion 222b connecting the second main portion 222a and the fourth surface 3. An edge of the first main portion 221a disposed close to the fourth surface and an edge of the second main portion 222a disposed close to the third surface may have a rounded shape. D1 may be 1.5 times or more of R1, and T1−T2 may be R1*2 or more and T1*0.8 or less, where T1 is a distance of the first main portion in the first direction, T2 is a distance of the first lead portion on the third surface in the first direction, R1 is a radius of the rounded shape, and D1 is a distance of an area by which the first lead portion 221b and the second main portion 222a overlap in the second direction.

Referring to FIGS. 10A and 10B, the first internal electrode 221 may include a first main portion 221a, and a first lead portion 221b connecting the first main portion 221a and the third surface 3, and the second internal electrode 222 may include a second main portion 222a, and a second lead portion 222b connecting the second main portion 222a and the fourth surface 4.

The first main portion 221a may be disposed to be spaced apart from the third and fourth surfaces 3 and 4, and may be electrically connected to the first external electrode 131 disposed on the third surface 3 by the first lead portion 221b exposed from the third surface 3, and the second main portion 222a may be disposed to be spaced apart from the third and fourth surfaces 3 and 4, and may be electrically connected to the second external electrode 132 disposed on the fourth surface 4 by the second lead portion 222b exposed from the fourth surface 4.

The edge of the first main portion 221a disposed close to the fourth surface and the edge of the second main portion 222a disposed close to the third surface 3 may have a rounded shape. Therefore, stress applied to the edges may be more effectively dispersed.

Referring to FIG. 10C, when a distance of the first main portion 221a in the first direction (the Z direction) is T1, a distance of the first lead portion 221b on the third surface 3 in the first direction (the Z direction) is T2, a radius of the rounded shape is R1, and a distance of a region Ob' in which the first lead portion 221b and the second main portion 222a overlap in the second direction (the X direction) is D1, D1 may be 1.5 times or more of R1, and T1−T2 may be R1*2 or more and T1*0.8 or less. In this case, T1, T2, R1 and D1 may be measured in a central portion of the body 110 in the third direction (the Y direction). For example, T1, T2, R1 and Dm can be measured after exposing cross-sections such as FIG. 10A or FIG. 10B by polishing the fifth surface or the sixth surface. D1 equals Db minus Dm. Db can be measured after exposing the end of the main part 221a and 222a by polishing the first surface or the second surface.

Since the lead portion 221b of the first internal electrode and the main portion 222a of the second internal electrode may be partially overlapped, an end of the first main portion 221a in the second direction and an end of the second main portion 222a in the second direction may be arranged not to overlap each other. Therefore, a concentration of stress in the end of the internal electrode may be dispersed, and an effect of thickening the dielectric layer between the internal electrodes in which the ends thereof overlap may be secured, to improve crack resistance and improve bending strength properties.

When the distance (D1) of the region Ob', in which the first lead portion 221b and the second main portion 222a overlap, in the second direction (the X direction) is less than 1.5 times R1, an effect of stress distribution may not be sufficient. An upper limit of D1 need not be particularly limited, and may be determined by considering designed capacitance of the multilayer ceramic capacitor. When D1 is too large, since an area in which a step difference is generated by the internal electrodes 221 and 222 may be increased, a shape of the body may be poor or a crack generation rate may increase, and since an area in which the internal electrodes 221 and 222 overlap is reduced to ne difficult to secure a capacitance, D1 may be 0.2 mm or less.

In addition, when T1−T2 is less than R1*2, an effect of lengthening a moisture penetration path may be insufficient or an effect of dispersing the stress may be insufficient, and when T1−T2 is more than T1*0.8, electrical connection between the internal electrode and the external electrode may be deteriorated.

R1 is not particularly limited, for example, R1 may be 0.02 mm or more and 0.55 mm or less.

When R1 is less than 0.02 mm, an effect of dispersing the stress may be insufficient due to the rounded shape, and when R1 is more than 0.55 mm, since an area in which a step difference is generated by the internal electrodes 221 and 222 may be increased, a shape of the body may be poor or a crack generation rate may increase, and since an area in which the internal electrodes 221 and 222 overlap is reduced to be difficult to secure a capacitance.

EXAMPLE

Sample chips were prepared by changing shapes of internal electrodes to satisfy the following Table 1.

Test Nos. 1 to 7 were prepared by alternately stacking a dielectric layer and an internal electrode in a third direction (a Y direction) to prepare sample chips, as illustrated in FIGS. 1 to 4.

Figure 9:
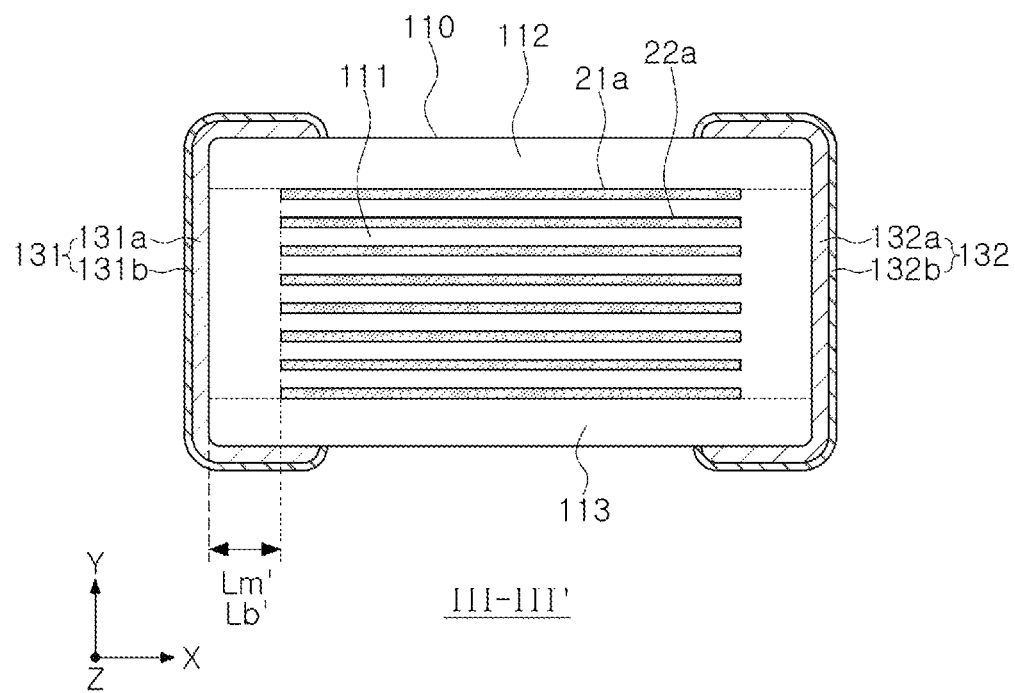
FIG. 9 is a cross-sectional view of Comparative Example 1 corresponding to FIG. 6.

In Test Nos. 8 to 10, L1 values were 0, and a lead portion 21b was disposed such that a distance (Lm') of a region in which one internal electrode 21 and the other internal electrode 2 do not overlap is identical to a distance (Lb') of the lead portion 21b, as illustrated in FIGS. 8 and 9 for Comparative Example 1.

Figure 11:
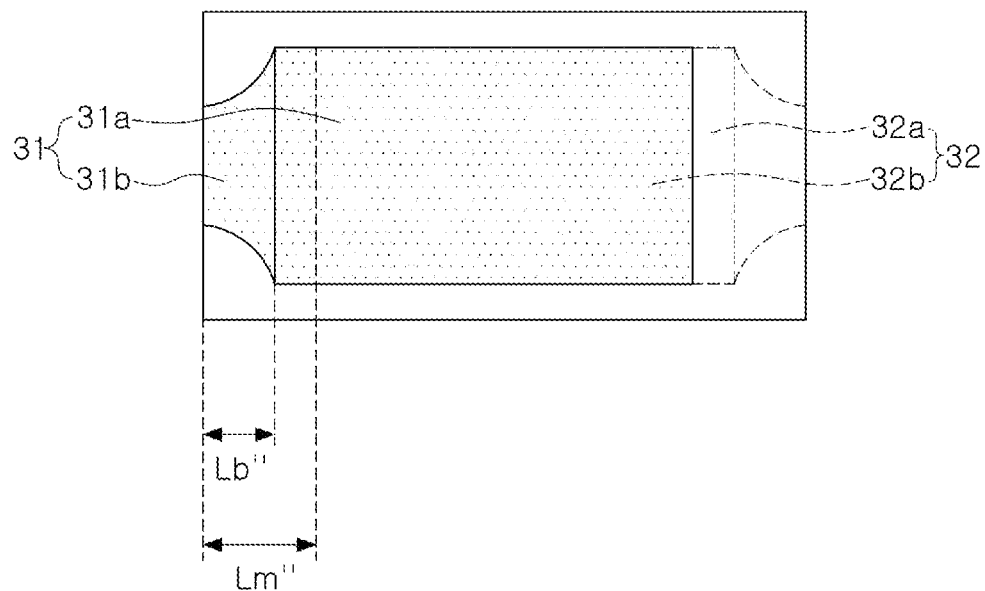
FIG. 11 is a plan view illustrating overlapped first and second internal electrodes according to Comparative Example 2.

In Test Nos. 11 to 13, L1 values were −0.025, and a lead portion 31b was disposed such that the lead portion 31b of one internal electrode 31 does not overlap the other internal electrode 32, and a distance (Lm") of a region in which the internal electrode 31 and the other internal electrode 32 do not overlap was longer than a distance (Lb") of the lead portion 31b, as illustrated in FIG. 11 for Comparative Example 2. Therefore, L1 values of Test Nos. 11 to 13 had negative values.

Figure 12:
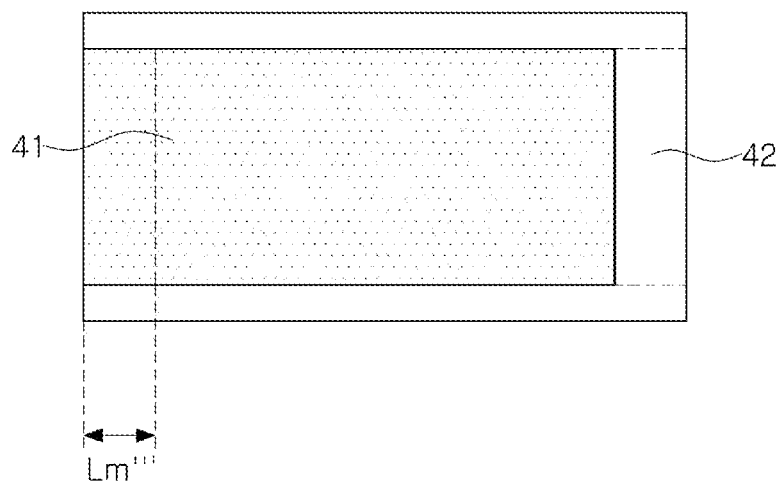
FIG. 12 is a plan view illustrating overlapped first and second internal electrodes according to Comparative Example 3.

Test No. 14 was in a form of conventional general internal electrode in which internal electrodes 41 and 42 do not include a lead portion, as illustrated in FIG. 12 for Comparative Example 3.

Failure rates of reliability for moisture resistance were described as ratios of sample chips in which insulation resistance was lowered to 1/1,000 or less, compared to an initial value, when 160 sample chips (MLCC) for each test number on a substrate (PCB) were mounted as illustrated in FIG. 7 such that first surfaces of bodies were mounting surfaces, and applying a voltage of 6V at a temperature of 85° C. and a relative humidity of 85% for 12 hours.

Occurrence rates of mounting cracks were determined by polishing first surfaces of bodies of sample chips in which reliability for moisture resistance was poor, and observing the inside of the first surfaces of the bodies of the sample chips to calculate a ratio of sample chips in which mounting cracks occur, among sample chips in which failure of reliability for moisture resistance occurs.

TABLE 1

| Test No. | H1 (mm) | H2 (mm) | H2/H1 | L1 (mm) | Failure Rate in Reliability for Moisture Resistance | Occurrence Rate of Mounting Cracks |
|---|---|---|---|---|---|---|
| 1* | 0.422 | 0.102 | 0.24 | 0.05 | 3.8% | 40.0% |
| 2 | 0.422 | 0.127 | 0.3 | 0.05 | 1.3% | 0.0% |
| 3 | 0.422 | 0.222 | 0.53 | 0.05 | 1.9% | 0.0% |
| 4 | 0.422 | 0.302 | 0.72 | 0.05 | 2.5% | 0.0% |
| 5 | 0.422 | 0.36 | 0.85 | 0.05 | 2.5% | 0.0% |
| 6* | 0.422 | 0.422 | 1 | 0.05 | 5.6% | 33.3% |
| 7 | 0.422 | 0.222 | 0.53 | 0.08 | 1.3% | 0.0% |
| 8* | 0.422 | 0.102 | 0.24 | 0 | 7.5% | 25.0% |
| 9* | 0.422 | 0.222 | 0.53 | 0 | 9.4% | 31.3% |
| 10* | 0.422 | 0.302 | 0.72 | 0 | 9.4% | 35.3% |
| 11* | 0.422 | 0.102 | 0.24 | −0.025 | 12.5% | 55.0% |
| 12* | 0.422 | 0.222 | 0.53 | −0.025 | 8.8% | 43.0% |
| 13* | 0.422 | 0.302 | 0.72 | −0.025 | 7.5% | 31.0% |
| 14* | 0.422 | 0.422 | 1 | 0 | 9.4% | 52.6% |

In Test Nos. 2-5, and 7, in which L1 presented in the present disclosure was 0.05 mm or more, and H2/H1 satisfied 0.3 or more and 0.9 or less, failure rates of reliability for moisture resistance and occurrence rates of mounting cracks were relatively low, as seen from the above. In particular, in Test No. 2, a failure rate of reliability for moisture resistance was 1.3%, and an occurrence rate of mounting cracks was significantly low at 0%, as seen from the above.

As seen from the above, failure rates of reliability for moisture resistance of Test Nos. 9, 10 and 11 were equal to or higher than a failure rate of reliability for moisture resistance of the conventional internal electrode type (Test No. 4). In particular, in Test No. 11, an occurrence rate of mounting cracks was higher than that of Test No. 14.

Therefore, reliability for moisture resistance and bending strength properties were significantly improved, as L1 presented in the present disclosure was 0.05 mm or more, and H2/H1 was satisfied to be 0.3 or more and 0.9 or less.

One of various effects of the present disclosure may be that, even when a multilayer electronic component is vertically mounted, a lead portion of a first internal electrode and a main portion of a second internal electrode may be partially overlapped to control a ratio of a width of the lead portion to a width of the main portion, to have excellent bending strength properties.

In addition, one of several effects of the present disclosure may be to improve reliability for moisture resistance.

However, various advantages and effects of the present disclosure are not limited to the above, and are easily understood in the process of describing the specific embodiment of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a first surface and a second surface, opposing each other in a first direction, a third surface and a fourth surface, connected to the first and second surfaces, and opposing each other in a second direction, and a fifth surface and a sixth surface, connected to the first to fourth surfaces, and opposing each other in a third direction, including a dielectric layer, and a first internal electrode and a second internal electrode alternately disposed with the dielectric layer interposed therebetween in the third direction;
a first external electrode disposed on the third surface; and
a second external electrode disposed on the fourth surface,
wherein the first internal electrode includes a first main portion and a first lead portion connecting the first main portion and the third surface, and the second internal electrode includes a second main portion and a second lead portion connecting the second main portion and the fourth surface,
wherein L1 is 0.05 mm or more, and H2/H1 is 0.3 or more and 0.9 or less,
where H1 is a distance of the first main portion in the first direction, H2 is a distance of the first lead portion on the third surface in the first direction, and L1 is a distance of an area by which the first lead portion and the second main portion overlap in the second direction.

2. The multilayer electronic component according to claim 1, wherein L1 is 0.2 mm or less.

3. The multilayer electronic component according to claim 1, wherein the first and second main portions have a rectangular shape.

4. The multilayer electronic component according to claim 1, wherein the first and second lead portions have a tapered shape.

5. The multilayer electronic component according to claim 1, wherein a distance of the first lead portion in the first direction gradually decreases from the first main portion toward the third surface.

6. The multilayer electronic component according to claim 1, wherein a distance of the first lead portion and the distance of the first main portion in the first direction are the same where the first lead portion is in contact with the first main portion.

7. The multilayer electronic component according to claim 1, wherein the first surface or the second surface is a mounting surface.

8. The multilayer electronic component according to claim 1, wherein the body comprises a capacitance forming portion overlapping the first and second internal electrodes to form capacitance, protective layers disposed on both end surfaces of the capacitance forming portion in the third direction, and margin portions disposed on both end surfaces of the capacitance forming portion in the first direction.

9. The multilayer electronic component according to claim 1, wherein H2/H1 is 0.3 or more and 0.85 or less.

10. A multilayer electronic component comprising:
a body including a first surface and a second surface, opposing each other in a first direction, a third surface and a fourth surface, connected to the first and second surfaces, and opposing each other in a second direction, and a fifth surface and a sixth surface, connected to the first to fourth surfaces, and opposing each other in a third direction, including a dielectric layer, and a first internal electrode and a second internal electrode alternately disposed with the dielectric layer interposed therebetween in the third direction;
a first external electrode disposed on the third surface; and
a second external electrode disposed on the fourth surface,
wherein the first internal electrode includes a first main portion and a first lead portion connecting the first main portion and the third surface,
the second internal electrode includes a second main portion and a second lead portion connecting the second main portion and the fourth surface, and
an edge of the first main portion facing the fourth surface and an edge of the second main portion facing the third surface have a rounded shape,
wherein D1 is 1.5 times or more of R1, and T1−T2 is R1*2 or more and T1*0.8 or less,
where T1 is a distance of the first main portion in the first direction, T2 is a distance of the first lead portion on the third surface in the first direction, R1 is a radius of the rounded shape, and D1 is a distance of an area by which the first lead portion and the second main portion overlap in the second direction.

11. The multilayer electronic component according to claim 10, wherein D1 is 0.2 mm or less.

12. The multilayer electronic component according to claim 10, wherein R1 is 0.02 mm or more and 0.55 mm or less.

13. The multilayer electronic component according to claim 10, wherein the first and second lead portions have a tapered shape.

14. The multilayer electronic component according to claim 10, wherein a distance of the first lead portion in the first direction gradually decreases from the first main portion toward the third surface.

15. The multilayer electronic component according to claim 10, wherein a distance of the first lead portion and the distance of the first main portion in the first direction are the same where the first lead portion is in contact with the first main portion.

16. The multilayer electronic component according to claim 10, wherein the first surface or the second surface is a mounting surface.

17. The multilayer electronic component according to claim 10, wherein the body comprises a capacitance forming portion overlapping the first and second internal electrodes to form capacitance, protective layers disposed on both end surfaces of the capacitance forming portion in the third direction, and margin portions disposed on both end surfaces of the capacitance forming portion in the first direction.

* * * * *